(12) United States Patent
Le Guillou et al.

(10) Patent No.: US 11,854,435 B2
(45) Date of Patent: Dec. 26, 2023

(54) DEVICE FOR MAKING THE ELECTRICAL MOVEMENTS OF MOVING PLATFORMS FOR SIMULATORS SAFER

(71) Applicant: THALES, Courbevoie (FR)

(72) Inventors: René Le Guillou, Maurepas (FR); Maxime Bonnet, Versailles (FR)

(73) Assignee: THALES, Courbevoie (FR)

( * ) Notice: Subject to any disclaimer, the term of this patent is extended or adjusted under 35 U.S.C. 154(b) by 901 days.

(21) Appl. No.: 16/617,857

(22) PCT Filed: May 28, 2018

(86) PCT No.: PCT/EP2018/063928
§ 371 (c)(1),
(2) Date: Nov. 27, 2019

(87) PCT Pub. No.: WO2018/219864
PCT Pub. Date: Dec. 6, 2018

(65) Prior Publication Data
US 2020/0152076 A1    May 14, 2020

(30) Foreign Application Priority Data

Jun. 1, 2017  (FR) ...................................... 1700585

(51) Int. Cl.
*G09B 9/12* (2006.01)
*B25J 5/00* (2006.01)
(Continued)

(52) U.S. Cl.
CPC .................. *G09B 9/12* (2013.01); *B25J 5/00* (2013.01); *B25J 9/1623* (2013.01); *B25J 13/085* (2013.01);
(Continued)

(58) Field of Classification Search
CPC ...................... H02K 41/02; G09B 9/12; G05B 2219/50162; G05B 2219/49257; G05B 2219/41309; F16H 25/18; B25J 5/00; B25J 9/1623; B25J 13/085; B25J 17/0216; B25J 17/0266
(Continued)

(56) References Cited

U.S. PATENT DOCUMENTS 4,627,196 A * 12/1986 Veale ...................... G05B 19/19
451/24
5,028,180 A * 7/1991 Sheldon ............. B23Q 11/0032
409/145
(Continued)

FOREIGN PATENT DOCUMENTS

| EP | 0 551 197 A1 | 7/1993 |
| EP | 2 407 954 A2 | 1/2012 |
| EP | 2 960 890 A1 | 12/2015 |

*Primary Examiner* — Rashad H Johnson
(74) *Attorney, Agent, or Firm* — BakerHostetler

(57) ABSTRACT

A device that makes it possible to make the movements of moving platforms safer and relates more particularly to a linear actuator that can be used in a hexapod positioner supporting a load is provided. The actuator is actuated by electric control and comprises at least one hydraulic damper positioned on the actuator such that the forces generated by damping in the event of extreme breakdown are experienced only by the load and are distributed such as to limit force and acceleration peaks.

12 Claims, 4 Drawing Sheets

(51) Int. Cl.
  *B25J 9/16* (2006.01)
  *B25J 13/08* (2006.01)
  *B25J 17/02* (2006.01)
  *F16H 25/18* (2006.01)
  *H02K 41/02* (2006.01)

(52) U.S. Cl.
  CPC ....... *B25J 17/0216* (2013.01); *B25J 17/0266* (2013.01); *F16H 25/18* (2013.01); *H02K 41/02* (2013.01); *G05B 2219/41309* (2013.01); *G05B 2219/49257* (2013.01); *G05B 2219/50162* (2013.01)

(58) Field of Classification Search
  USPC ........................................................ 318/135
  See application file for complete search history.

(56) References Cited

U.S. PATENT DOCUMENTS

| | | | | |
|---|---|---|---|---|
| 5,431,569 | A * | 7/1995 | Simpkins | G09B 9/02 434/59 |
| 5,829,727 | A * | 11/1998 | Chinomi | B60N 2/067 248/429 |
| 5,975,907 | A * | 11/1999 | Advani | A63G 31/16 472/130 |
| 9,777,793 | B1 * | 10/2017 | Chen | G05B 19/402 |
| 2002/0029610 | A1 * | 3/2002 | Chrystall | A43D 999/00 73/7 |
| 2005/0042578 | A1 * | 2/2005 | Ammon | G09B 9/04 434/62 |
| 2007/0059668 | A1 * | 3/2007 | Mallaci | G09B 9/02 434/29 |
| 2008/0093322 | A1 * | 4/2008 | Ehrenleitner | B66F 7/08 212/274 |
| 2012/0133477 | A1 * | 5/2012 | West | H01H 85/46 337/4 |
| 2012/0180593 | A1 * | 7/2012 | Alet | B25J 17/0266 74/490.07 |
| 2013/0061652 | A1 * | 3/2013 | Wittmann | G01M 17/0078 73/12.04 |
| 2013/0118281 | A1 * | 5/2013 | Duplouy | B25J 17/0266 74/108 |
| 2015/0217855 | A1 * | 8/2015 | Davies | B64C 13/50 244/99.2 |
| 2015/0354748 | A1 * | 12/2015 | Kang | A63G 31/16 248/371 |
| 2015/0356878 | A1 * | 12/2015 | Warmerdam | G09B 9/12 73/865.6 |
| 2016/0139577 | A1 * | 5/2016 | Seehof | B25J 9/1623 702/33 |
| 2016/0140862 | A1 * | 5/2016 | Van Lookeren Campagne | G09B 9/14 434/55 |
| 2016/0148526 | A1 * | 5/2016 | Morris | A63G 31/16 434/62 |
| 2016/0148528 | A1 * | 5/2016 | Morris | G09B 9/12 434/55 |
| 2016/0167224 | A1 * | 6/2016 | Foster | G05B 11/011 74/479.01 |
| 2017/0072327 | A1 * | 3/2017 | Wach | A63G 31/16 |
| 2018/0072189 | A1 * | 3/2018 | Plante | B60N 2/501 |
| 2018/0086599 | A1 * | 3/2018 | Hess | B66B 7/048 |
| 2020/0039072 | A1 * | 2/2020 | Mankin | B25J 9/1671 |
| 2020/0152076 | A1 * | 5/2020 | Le Guillou | G09B 9/14 |
| 2020/0317480 | A1 * | 10/2020 | Shankar | B66F 3/44 |
| 2020/0379464 | A1 * | 12/2020 | Tacklind | B62K 11/007 |
| 2021/0251827 | A1 * | 8/2021 | Nicholson | A61G 7/1048 |
| 2022/0252210 | A1 * | 8/2022 | In | F16C 13/006 |
| 2022/0254269 | A1 * | 8/2022 | Kirkman | G09B 9/14 |

* cited by examiner

DEVICE FOR MAKING THE ELECTRICAL MOVEMENTS OF MOVING PLATFORMS FOR SIMULATORS SAFER

CROSS-REFERENCE TO RELATED APPLICATIONS

This application is a National Stage of International patent application PCT/EP2018/063928, filed on May 28, 2018, which claims priority to foreign French patent application No. FR 1700585, filed on Jun. 1, 2017, the disclosures of which are incorporated by reference in their entirety.

FIELD OF THE INVENTION

The invention relates to the field of linear actuators and in particular relates to a device for such actuators that is adapted for making the movements of moving platforms safer. The invention applies in particular in the field of flight simulators, to moving platforms having six degrees of freedom that are driven by a hexapod positioner.

BACKGROUND

Flight simulator cabins are subject to movements that require high levels of performance and in particular high speeds. The cabin is mounted on a moving platform that is moved by a system that can be driven by different drive units. There are various types of moving platform for simulators, including one known as a "Stewart platform", which is based on the use of a hexapod positioner allowing a movement with six degrees of freedom. A hexapod positioner generally comprises six legs or linear actuators connecting a moving deck to a fixed base. The legs are actuated such as to change in length and to vary the orientation of the deck. In known hexapod positioners, each actuator comprises a linear ram articulated at each of its ends on the fixed base and on the moving deck. The rams are generally large and have their onboard drive system. Coordinated adjustment of the length of each of the six legs makes it possible to move the moving deck as a function of six degrees of freedom.

The platform of a flight simulator has to support considerable masses (onboard simulation visual system, cabin, supporting structures) that may weigh in excess of fifteen tons and thus, when the cabin moves, the levels of energy involved are significant. Industrial systems have to meet qualification criteria, in particular, in the case of the avionics industry, those defined by certification bodies, notably the Federal Aviation Administration (FAA) and the Joint Aviation Authorities (JAA), so it is imperative, when the platform moves, to ensure the safety not only of the equipment but also of people. Thus, the platform has to be designed such as to damp shocks in order to protect the mechanics and to limit acceleration in order to protect people, in particular in the event of extreme breakdowns. One of the most negative risks of shock is that of an extreme breakdown, which has the result of taking the structure overall to maximum speed on the stops of the rams. The levels of energy involved in the event of extreme breakdown are of two kinds:

kinetic energy, proportional to inertia and to the square of the speed, and motive energy during the stop phase.

Hydraulic rams used principally in heavy industry to move loads in excess of fourteen tons generally incorporate hydraulic shock dampers. These latter function by converting kinetic energy into thermal energy by pressurizing fluid through calibrated orifices or in cones. They progressively compress a volume of oil in such a manner as to progressively absorb significant levels of energy, to dissipate said levels of energy and to decelerate a constant force with constant deceleration, and to minimizes stresses.

However, for some years, as a consequence of seeking more environmentally friendly, "green" solutions and reducing electricity consumption, hydraulic rams have been replaced by electric rams that, moreover, consume less electricity than hydraulic systems (or hydraulic ram central units).

In point of fact, the incorporation of safety elements into actuators with electric rams is very restrictive owing to their design and their overall size. FIG. 1 schematically illustrates an electric ram 10 with a ball screw that generally comprises a body 11 in which there are, in series, a motor 12, a nut 13 and a screw 14. The motor turns the screw, the nut being immobilized in rotation, it moves linearly, causes a rod 15 to exit and linearly moves a load M. A damper 16 is positioned at the top of the body such as to limit and to slow the travel of the load M at the time of a downward movement. Given its location, this damper is inefficient and very specific, the forces passing via the motor. Furthermore, on this type of ram, it is not possible to install a damper when the actuator extends.

There are, nowadays, two types of solution for damping shocks in the event of the use of electric rams in heavy industry. One, elastomer-based solution, which does not, however, make it possible to absorb energy progressively and which, furthermore, generates significant forces, particularly at the internal screw of the ram, thus posing a problem of reliability. Another solution is based on mechanical deformations, but it is bulkier and, furthermore, cannot be used more than once per shock.

There is thus no solution for an actuator with electric rams that makes it possible to absorb and to dissipate very significant energy levels in the event of breakdowns.

In particular there is no solution that makes it possible to damp the shocks in the event of extreme breakdown, experienced by a simulator mounted on a hexapod positioner equipped with electric actuators.

Furthermore, there is the need for a solution that limits the forces generated with a view to protecting the structure mounted on a hexapod positioner and that limits the accelerations experienced by the simulator crew. Lastly, it is desirable for the energy that is dissipated to be dissipated over a minimum path such as not to affect the working stroke of the actuators.

The present invention proposes to meet the above-mentioned needs.

SUMMARY OF THE INVENTION

An object of the present invention is to propose a device that makes it possible, in the event of shock, to make the movements of moving platforms of hexapod positioners safer.

Advantageously, the device of the invention allows combined use of electric actuators and hydraulic dampers.

Advantageously, the arrangement of the hydraulic damper with the electric actuator prevents forces from passing via the drive unit, with a view to protecting it in the event of a shock.

Advantageously, the arrangement of the hydraulic damper with the electric actuator is modular and makes it possible to have one or more hydraulic dampers for landing in the event of high-travel or low-travel shock.

Advantageously, the device of the invention makes it possible to calibrate hydraulic dampers to the load carried by a hexapod positioner.

The invention will apply advantageously to the field of flight simulators and, in particular simulators mounted on platforms having actuators with six degrees of freedom.

To that end, a subject of the invention is a linear actuator that can be used in a hexapod positioner supporting a load. The actuator is actuated by electric control and comprises at least one hydraulic damper positioned on the actuator such that the forces generated by damping in the event of extreme breakdown are experienced only by the load and are distributed such as to limit force and acceleration peaks.

According to embodiments:

the actuator comprises a leg of fixed length, an upper end of which is attached to a moving platform by a ball joint with three degrees of freedom in rotation and the other, lower end of which is movable along a guide rail attached to a fixed base;

at least one hydraulic damper is movable and coupled to the movable lower end of the leg;

at least one hydraulic damper is fixed and coupled to the guide rail;

the actuator comprises two fixed hydraulic dampers coupled to the guide rail;

the two fixed hydraulic dampers are positioned side-by-side at one end of the guide rail.

the two fixed hydraulic dampers are positioned at each end of the guide rail;

the lower end of the leg moves on the guide rail by means of a carriage actuated by a motor meshing on a belt;

the belt is notched;

the guide rail is on a plane that is inclined relative to the fixed base.

The invention also covers a hexapod positioner comprising a fixed base and a moving platform, the positioner further comprising six linear actuators as claimed.

A further subject of the invention is a flight simulator mounted on a hexapod positioner as claimed.

BRIEF DESCRIPTION OF THE DRAWINGS

Different aspects and advantages of the invention will become apparent on the basis of the description of a preferred, but non-limiting, method of implementation of the invention, with reference to the following figures.

DETAILED DESCRIPTION

Generally speaking, the invention proposes a device that, in the event of extreme breakdown, makes it possible to damp the shocks experienced by a load mounted on a hexapod positioner equipped with electric actuators.

Figure 2A:
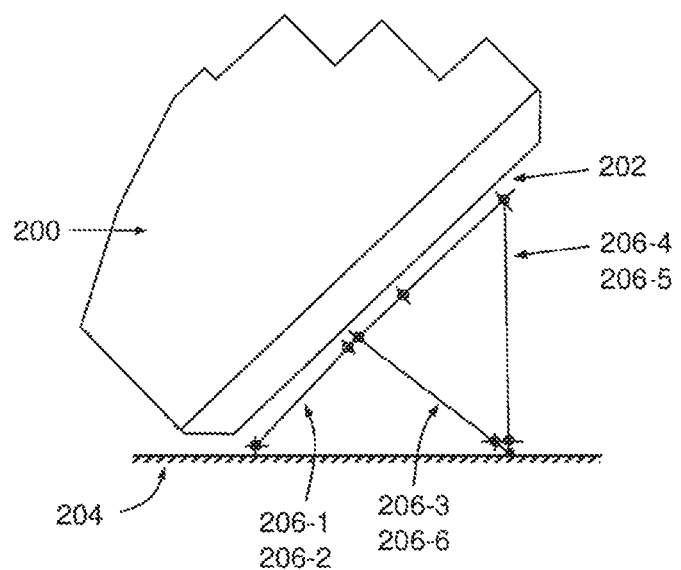
FIGS. 2a and 2b schematically illustrate two configurations of extreme breakdown for a hexapod positioner.
Figure 2B:
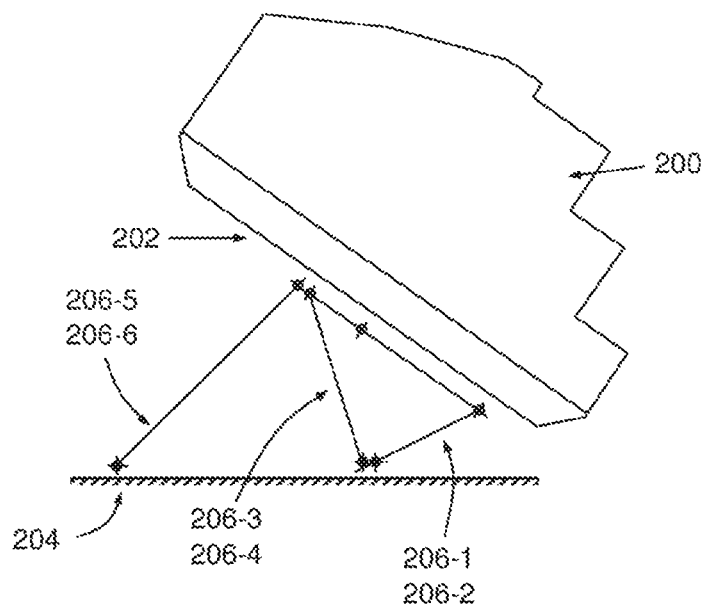

To illustrate the problem solved by the invention, reference is made to FIGS. 2a and 2b, which schematically show two configurations of extreme breakdown in the case of a hexapod positioner. For the sake of clarity, the same elements bear the same references in the various figures. A load 200 is mounted on a moving platform 202 of a hexapod positioner that comprises six linear actuators (206-1 to 206-6), connecting the moving platform to a fixed base 204. The actuators allow movement of the load in accordance with six degrees of freedom.

A first, very negative case is that in which four actuators (206-3, 206-4, 206-5, 206-6) are immobilized. In this configuration, all the energy is then concentrated on the two remaining actuators (206-1 and 206-2). The remaining actuators may be actuated simultaneously at maximum speed either downward, as illustrated in FIG. 2a, or upward, as illustrated in FIG. 2b. The levels of energy employed may then be of the order of 8000 Joules. In the case of hydraulic actuators having high-performance dampers, this may generate forces potentially of up to 30 tons on each actuator and accelerations of 1.5 g.

Furthermore, it should also be noted that the top damper in the case of actuators using hydraulic rams is less efficient. Indeed, the upper chamber of the ram is smaller than the bottom chamber, owing to the volume of the rod. Energy at the time of damping is dissipated by the volume of oil that passes via the restriction. This means that the top damper is less efficient as compared to the bottom damper.

The problem that arises, therefore, in the case of electric actuators is that of how to dissipate this energy while still limiting the accelerations experienced to values that are imposed by regulations.

Figure 1:
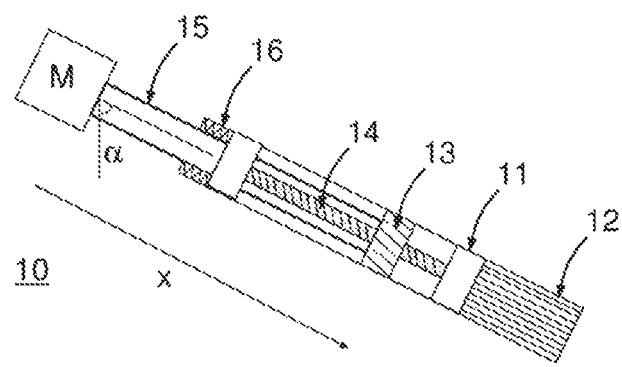
FIG. 1 schematically illustrates a prior-art electric ram.
Figure 3:
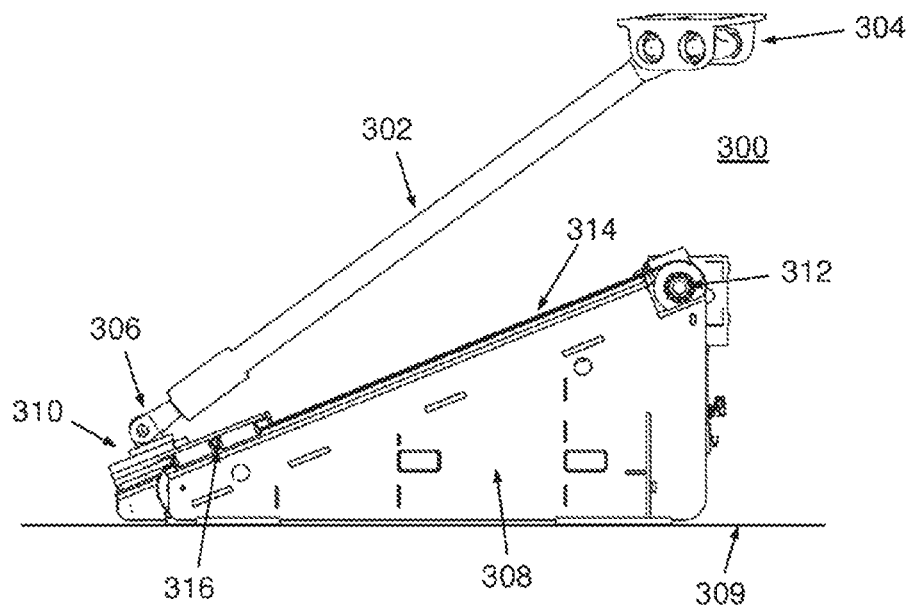
FIG. 3 schematically illustrates an electric actuator with a hydraulic damper according to the invention.

FIG. 3 schematically illustrates an electric actuator with a hydraulic damper 300 according to the invention. Advantageously, the actuator has no screw-nut system and is, in particular, adapted for use in hexapod positioners.

Patent application EP 2 407 954 A2, from the same applicant, which is incorporated herein by reference, describes configurations of hexapod positions that comprise electric actuators without a screw-nut system. Such a hexapod positioner generally comprises a fixed base and a moving platform that is moved via six linear actuators. In the context of the invention, a hexapod positioner comprises six electric linear actuators with a hydraulic damper 300. An advantageous application is that of simulators with a cockpit mounted on the moving platform, for flight or driving simulators.

The actuator 300 comprises a leg or connecting rod 302 of fixed length, an upper end 304 of which may be attached to a moving platform by a ball joint with three degrees of freedom in rotation, and a lower end 306 of which may be movable along a guide rail 308 that may be attached to a fixed base 309. According to variant embodiments, the guide rail is horizontal or placed on a plane that is inclined relative to the fixed base such as to increase the effects of vertical, longitudinal and lateral movement.

The lower end 306 of the actuator may move on the guide rail by means of a carriage 310 actuated by a motor or gear motor 312 meshing on a transmission belt 314. In an advantageous embodiment, the belt is based on steel cables and is notched for landing in event of a very negative breakdown in the case of which, the load moving at its maximum speed, abrupt immobilization of the motor occurs at any point on the rail. The notched belt thus provides an additional safety feature by skipping teeth and by damping an abrupt stop that may give rise to a very high instantaneous force.

The electric actuator 300 of the invention furthermore comprises at least one hydraulic damper 316. Advantageously, the hydraulic damper is positioned on the actuator such that, in the event of breakdown, the forces generated by damping are experienced only by the load carried by the moving platform.

Figure 5:
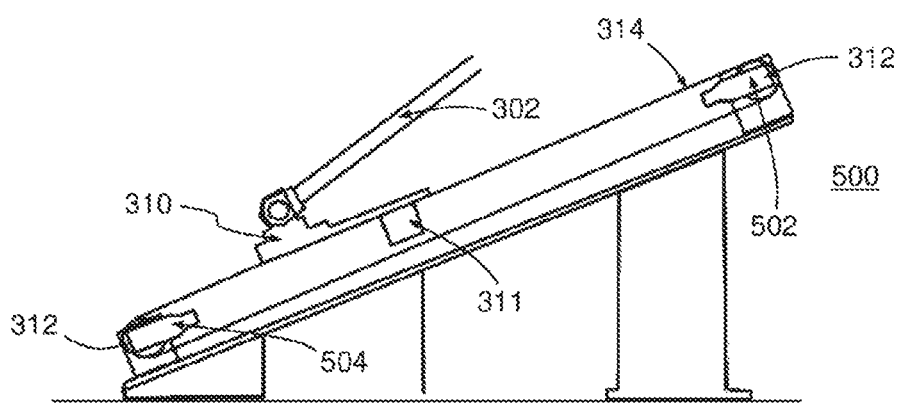
FIG. 5 shows an embodiment of an electric actuator with a hydraulic damper according to the invention.
Figure 6:
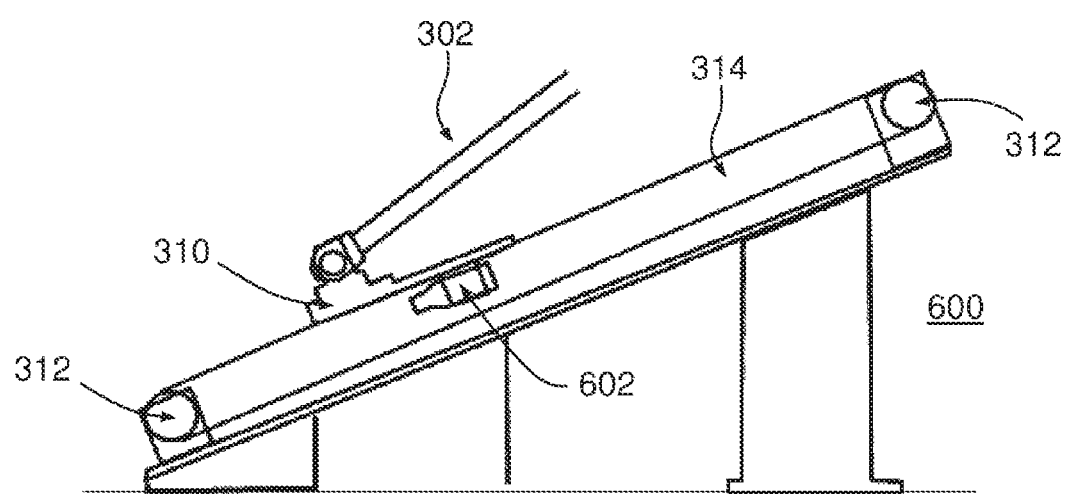
FIG. 6 shows another embodiment of an electric actuator with a hydraulic damper according to the invention.

According to variant embodiments, two of which are described in FIGS. 5 and 6, the hydraulic damper may be fixed or movable.

Figure 4:
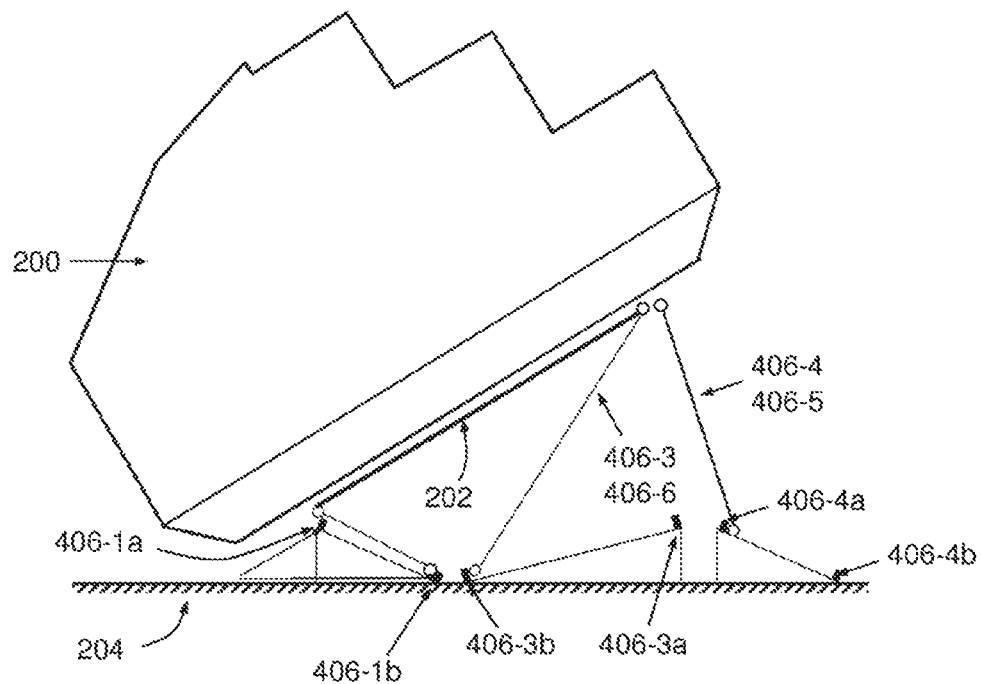
FIG. 4 schematically illustrates a configuration of extreme breakdown according to FIG. 2a, with the use of hexapod actuators with dampers according to the invention.

FIG. 4 schematically illustrates a configuration of extreme breakdown according to FIG. 2a, with the use of six actuators (406-1 to 406-6) according to the invention. In the case illustrated, each electric actuator is equipped with two hydraulic dampers, each placed at one end of the guide rail. For reasons of clarity, only the hydraulic dampers of three electric actuators are shown, namely the hydraulic dampers (406-1a, 406-1b) of the actuator 406-1, the hydraulic dampers (406-3a, 406-3b) of the actuator 406-3 and the hydraulic dampers (406-4a, 406-4b) of the actuator 406-4. Thus, the figure illustrates that this solution makes it possible advantageously to position top and bottom hydraulic dampers that are totally independent of the actuator. In known screw or hydraulic actuators, the dampers are integrated and it is not possible to adapt them to the load or to change them in the event of a problem.

In FIG. 4, the dampers (406-1a and 406-1b) are positioned on the triangular supports fixed to the ground. In the configuration of extreme breakdown described, the load strikes the bottom damper at maximum speed. The forces pass from the pallet toward the connecting rods then the carriage, and lastly, the damper. It should be noted that the motor and its belt, which function in parallel, are not involved. This configuration makes it possible to protect the reducer and the belt and it is thus possible to take account of all breakdown scenarios, particularly that of the onboard load at maximum speed with simultaneous consideration of the maximum force of the motor.

In the conventional solutions in FIG. 2, it is not possible to take account of the energy produced by the maximum force of the motor in addition to kinetic energy. The motor has to be stopped in the event of shock by end-of-travel information that can be delivered by software, and, finally, by a brake, which has a response time. None of these conditions enhances safety.

Dampers of hydraulic or other type that are known are still very bulky, albeit efficient. In the cases of FIGS. 2a and 2b, it is impossible to incorporate them into the rams or to incorporate them into the electric actuators.

In the device of the invention shown in FIG. 4, these drawbacks are obviated because the dampers are on the fixed part of the structure.

Thus, advantageously, the significance of the proposed solution is that, as the dampers are on the fixed part of the structure, the forces are taken up directly by the latter and there is no problem of bulkiness.

In a preferred manner, the invention incorporates hydraulic dampers with calibrated orifices, since:
  they have the efficiency of hydraulic ram dampers;
  they can be reused with deterioration;
  they can be adapted to suit the load;
  they make it possible to provide complete protection for the motor and the reducer in the event of shock.

The well-known principle of the operating method of this type of damper is that the piston progressively compresses a volume of oil and, via calibration of the orifices, this makes it possible progressively to dissipate motive energy and kinetic energy with a view to maintaining constant deceleration. This system thus makes it possible to reduce deceleration and thereby to minimize forces on the structure.

FIG. 5 shows an embodiment of an electric actuator 500 according to the invention that has a top hydraulic damper 502 and a bottom hydraulic damper 504. Each hydraulic damper is fixed, positioned at each end of the guide rail. This configuration makes it possible to achieve the same efficiency in the event of shock upward or downward, which is not possible with known dampers of screw-type electric rams.

The carriage 310 on which the lower end of the connecting rod 302 rests comprises a stop 311, positioned under the carriage in the axis of the dampers. In the event of shock, the top or bottom damper strikes the stop. The belt 314 and the gear motor directly connected to the pulley 312 then experience only drive torque, which is limited. The motor and the reducer are thus protected. In normal functioning, the force exerted by the connecting rod is taken up by the carriage, the belt, the pulley and the gear motor.

In a variant embodiment, two fixed hydraulic dampers may be positioned side-by side. They may be at one end of the guide rail or at each end of the guide rail, for use in parallel, thereby making it possible to absorb a large quantity of energy over a short distance.

FIG. 6 shows another embodiment of an electric actuator 600 according to the invention that has a single hydraulic damper 602 for damping upward and downward shocks. The hydraulic damper is movable and coupled to the movable lower end of the leg. In the configuration illustrated, the damper is positioned under the carriage 310 on which the lower end of the connecting rod 302 rests. In the event of shock, the hydraulic damper strikes a top or bottom stop of the guide rail and the belt 314 and gear motor 312 thus experience only drive torque, which is limited. The motor and the reducer are thus protected.

Advantageously, it is possible to use adjustable dampers of different caliber, depending on load. Indeed, the caliber and the type of damper may be chosen as a function of the amount of energy to be dissipated and of the type of energy (kinetic energy or motive energy).

The use of adjustable dampers makes it possible for them to be adapted to the most negative case of the application in place, corresponding to a configuration that usually cannot be finalized until final assembly. Lastly, the type of damper being independent of the actuator, it is advantageous to select the type of hydraulic damper in accordance with the load and with operating conditions.

In a specific embodiment, for a cabin movement of, say, 14 tons in which loads may vary from 9 tons to 14 tons, the dampers must be adapted to the actual load and to inertia.

In the conventional case of the configuration in FIG. 2 (2a or 2b), with an electric actuator with a ball screw, the damper is integrated into the actuator and cannot be modified without completely changing the actuator.

In the case of the device of the invention, the damper being independent of the actuator, it may then be different in accordance with the load scenario, and can be adapted and adjusted.

The present description illustrates different embodiments of the invention but is not limiting. The examples have been chosen to allow satisfactory comprehension of the principles of the invention and a specific application, are not exhaustive and the description must enable a person skilled in the art to make modifications and implementation variations while respecting the same principles. Thus, for example, it is possible to add to the device a position sensor to avoid the linear actuator striking the mechanical stop in a dangerous manner. The sensor makes it possible to detect the position of the actuator close to the mechanical stop and to use the motor to slow down or, if necessary, to stop the system via its own torque, or, if necessary, via an integral brake. Although these safety features are generally implemented, regulations require there to be absolute safety in the form of a physical damper that, irrespective of breakdown or mishandling, ensures that safety is guaranteed. The present invention meets this requirement.

The invention claimed is:

1. A linear actuator actuated by electric control and that can be used in a hexapod positioner, said hexapod positioner comprising six linear actuators actuated by electric control and wherein each actuator has a leg of fixed length, an upper end of which is attached to a moving platform supporting a load and the other, lower end of which is moving along a guide rail, each of said six linear actuators comprises at least one hydraulic damper with calibrated orifices that is positioned on the guide rail and proximate a carriage on which the lower end of the leg rests, the calibration and the position of said at least one hydraulic damper being defined as a function of said load such that the forces generated by damping in the event of extreme breakdown are experienced only by said load and are distributed such as to limit force and acceleration peaks.

2. The actuator as claimed in claim 1, wherein the upper end of the leg is attached to the moving platform by a ball joint with three degrees of freedom in rotation and the guide rail is attached to a fixed base.

3. The actuator as claimed in claim 2, wherein said at least one hydraulic damper is moving on the guide rail and coupled to the lower moving end of the leg.

4. The actuator as claimed in claim 2, wherein said at least one hydraulic damper is fixed on the guide rail.

5. The actuator as claimed in claim 2, wherein it comprises two hydraulic dampers fixed on the guide rail.

6. The actuator as claimed in claim 5, wherein the two fixed hydraulic dampers are positioned side-by-side at one end of the guide rail.

7. The actuator as claimed in claim 5, wherein the two fixed hydraulic dampers are positioned at each end of the guide rail.

8. The actuator as claimed in claim 2, wherein the lower end of the leg moves on the guide rail by means of a carriage actuated by a motor meshing on a belt.

9. The actuator as claimed in claim 8, wherein the belt is notched.

10. The actuator as claimed in claim 2, wherein the guide rail is on a plane that is inclined relative to the fixed base.

11. A hexapod positioner comprising a fixed base and a moving platform, the positioner further comprising six linear actuators as claimed in claim 1.

12. A flight simulator mounted on a hexapod positioner as claimed in claim 11.

* * * * *